United States Patent
Nishiyama

(10) Patent No.: US 12,277,470 B2
(45) Date of Patent: Apr. 15, 2025

(54) MAIN DEVICE, SUB-DEVICE AND COMMUNICATION SYSTEM

(71) Applicant: ROHM CO., LTD., Kyoto (JP)

(72) Inventor: Takahiro Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 18/072,859

(22) Filed: Dec. 1, 2022

(65) Prior Publication Data

US 2023/0214607 A1 Jul. 6, 2023

(30) Foreign Application Priority Data

Jan. 6, 2022 (JP) ................................. 2022-000852

(51) Int. Cl.
| | | |
|---|---|---|
| G06K 7/10 | (2006.01) | |
| G06K 7/00 | (2006.01) | |
| G06K 19/07 | (2006.01) | |
| H04L 1/1607 | (2023.01) | |

(52) U.S. Cl.
CPC ........ G06K 7/10297 (2013.01); H04L 1/1607 (2013.01); *G06K 7/0008* (2013.01); *G06K 19/0723* (2013.01)

(58) Field of Classification Search
None
See application file for complete search history.

(56) References Cited

U.S. PATENT DOCUMENTS

| | | | | |
|---|---|---|---|---|
| 9,367,393 | B2 * | 6/2016 | Akiyama | G06F 11/1076 |
| 9,432,194 | B2 * | 8/2016 | Mitsuzumi | G06F 21/31 |
| 11,068,163 | B1 * | 7/2021 | Leggette | H04L 67/306 |
| 11,875,217 | B2 * | 1/2024 | Sakaba | H04L 67/125 |
| 2004/0225710 | A1 * | 11/2004 | Murai | H04L 65/1101 |
| | | | | 709/200 |
| 2007/0016717 | A1 * | 1/2007 | Miyazaki | G06F 12/0804 |
| | | | | 711/E12.04 |
| 2012/0027134 | A1 * | 2/2012 | Gladwin | G06F 11/1076 |
| | | | | 375/340 |
| 2012/0030437 | A1 * | 2/2012 | Resch | G06F 11/1076 |
| | | | | 711/E12.001 |
| 2015/0106682 | A1 * | 4/2015 | Grocutt | G06F 11/1004 |
| | | | | 714/807 |
| 2015/0154073 | A1 * | 6/2015 | Akiyama | G06F 12/0868 |
| | | | | 714/807 |
| 2019/0155776 | A1 * | 5/2019 | Miyama | H03K 19/003 |
| 2022/0269437 | A1 * | 8/2022 | Muthiah | G06F 3/0661 |
| 2023/0214607 | A1 * | 7/2023 | Nishiyama | G06K 7/10297 |
| | | | | 340/10.1 |

FOREIGN PATENT DOCUMENTS

JP 2019096960 A 6/2019

* cited by examiner

*Primary Examiner* — Carlos Garcia
(74) *Attorney, Agent, or Firm* — Fish & Richardson P.C.

(57) ABSTRACT

The present disclosure provides a main device, a sub-device and a communication system. The sub-device includes a receiver, a status signal transmitter, a read memory, and a status setting unit. The receiver is configured to receive a read command from the main device. The status signal transmitter is configured to transmit a status signal to the main device. The status setting unit is configured to determine whether a read data has been prepared in the read memory. When the read data has been prepared in the read memory, the status signal is set to a first state. When the read data has not been prepared in the read memory, the status signal is set to a second state.

9 Claims, 5 Drawing Sheets

MAIN DEVICE, SUB-DEVICE AND COMMUNICATION SYSTEM

TECHNICAL FIELD

The present disclosure discloses a main device and a sub-device communicating with each other, and a communication system including the main device and the sub-device.

BACKGROUND

A communication system in which a main device reads data from a sub-device by using I2C communications is mounted in various electronic apparatuses.

PRIOR ART DOCUMENT

Patent Publication

[Patent document 1] Japan Patent Publication No. 2019-96960 (paragraph [0021])

SUMMARY

Problems to be Solved by the Disclosure

In a communication system, if a sub-device sends data to a main device before data is fully prepared at the sub-device, an issue that the main device reads erroneous data is resulted.

As a countermeasure against the occurrence of the above situation, the main device is configured to wait for a maximum time that guarantees full preparation of data at the sub-device, and such that the main device instructs the sub-device to transmit data. In the above configuration, the main device needs to wait for a period of idle time while the sub-device prepares the data as soon as possible. As a result, communication overhead as well as time need for communications are increased.

As a countermeasure for preventing the occurrence of the above issue, the clock stretching specification in I2C is adopted (Please refer to Patent document 1). If clock stretching is used, the generation of a clock at the main device can be suppressed from the sub-device, and thus the standby time of the main device can be optimized according to the data preparation time of the sub-device. However, since clock stretching is an optional specification, the main device may not be installed with the clock stretching function.

Technical Means for Solving the Problem

A sub-device disclosed by the present disclosure includes a receiver, a status signal transmitter, a read memory and a status setting unit. The receiver is configured to receive a read command from a main device. The status signal transmitter is configured to transmit a status signal to the main device. The status setting unit is configured to determine whether a read data has been prepared in the read memory. When the read data has been prepared in the read memory, the status signal is set to a first state; when the read data has not been prepared in the read memory, the status signal is set to a second state.

Moreover, a main device disclosed by the present disclosure includes a transmitter, a status signal receiver and a controller. The transmitter is configured to transmit a read command to the sub-device. The status signal receiver is configured to receive a status signal from the sub-device. The controller is configured to render the transmitter to re-transmit the read command when the status signal is in a first state, and read a data from the sub-device when the status signal is in a second state.

A communication system disclosed by the present disclosure includes the sub-device of the above configuration and the main device of the above configuration.

Effects of the Disclosure

According to the disclosure of the present disclosure, a reduced communication time can be achieved without using clock stretching.

DETAILED DESCRIPTION OF THE EMBODIMENTS

<Configuration of Communication System>

Figure 1:
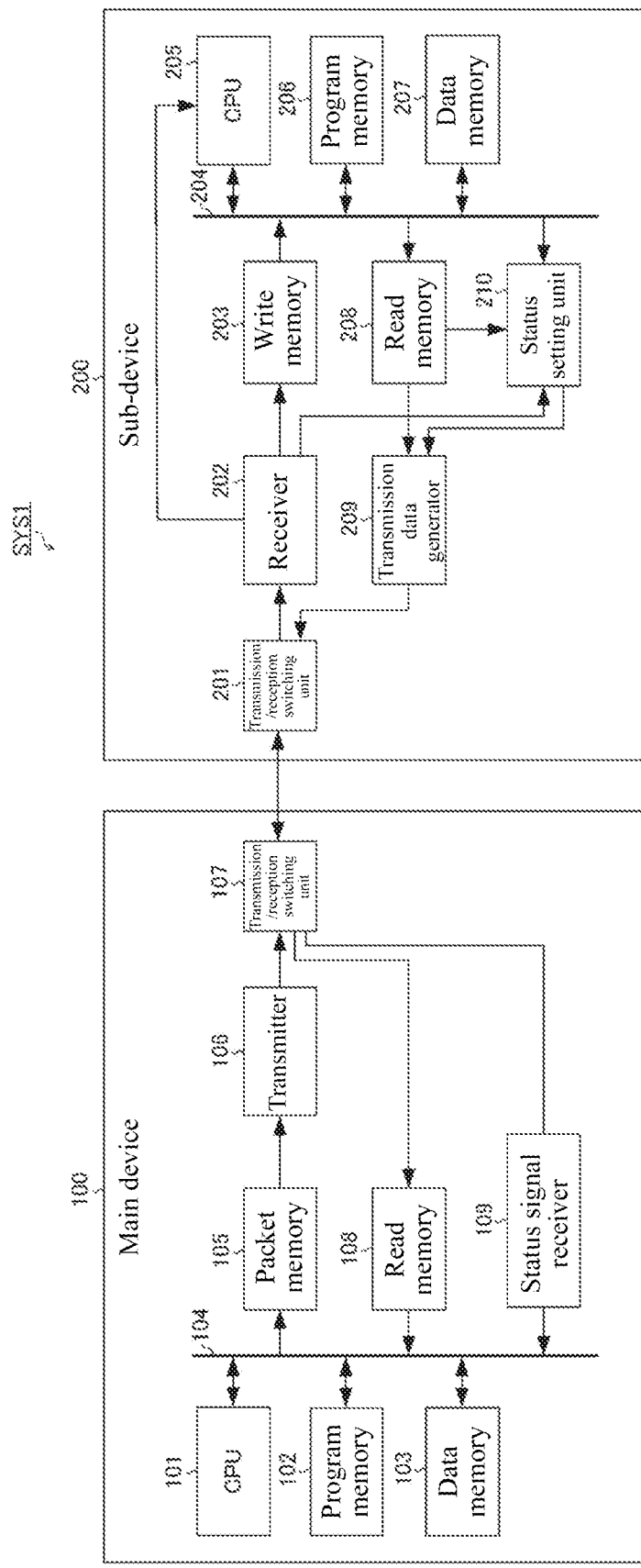
FIG. 1 is a diagram of a configuration example of a communication system according to an embodiment.

FIG. 1 shows a diagram of a configuration example of a communication system according to an embodiment. The communication system SYS1 shown in FIG. 1 includes a main device 100 and a sub-device 200. The main device 100 and the sub-device 200 perform I2C communications based on a clock signal output from the main device 100.

The main device 100 includes a central processing unit (CPU) 101, a program memory 102, a data memory 103, a bus 104, a packet memory 105, a transmitter 106, a transmission/reception switching unit 107, a read memory 108, and a status signal receiver 109.

The CPU 101 controls the entire main device 100 according to a program stored in the program memory 102.

The program memory 102 stores programs, and the data memory 103 stores data.

The bus 104 connects the CPU 101, the program memory 102, the data memory 103, the packet memory 105, the read memory 106 and the status signal receiver 109 to one another.

The packet memory 105 temporarily stores packets. The packet memory 105 is implemented by, for example, a first-in-first-out (FIFO) memory.

Figure 2:
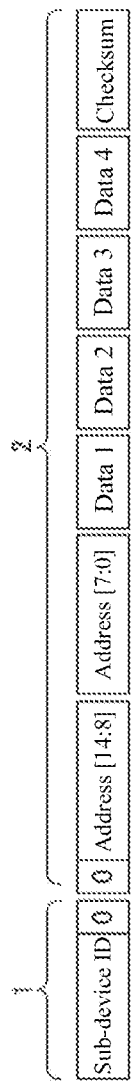
FIG. 2 is a schematic diagram of a brief configuration example of a write packet.

A write packet is a packet used to write data to a data memory 207 of the sub-device 200. FIG. 2 shows a schematic diagram of a brief configuration example of a write packet.

The write packet shown in FIG. 2 is configured to arrange the first byte 1 defined by the I2C standard and the data 2 defined by the I2C standard in order from the beginning.

The first byte 1 includes information related to a sub-device ID and direction. In the example in FIG. 2, the direction is "0". The value "0" means that writing information from the main device 100 to the sub-device 200 is to be performed. In the write packet, the value "0" means writing to a memory address and a memory of the sub-device 200 is to be performed.

The content of the data 2 can be determined by a user as desired. In the data 2 in the example in FIG. 2, the write command, which is "0", the address [14:8] of the data memory 207 of the sub-device 200, the address [7:0] of the data memory 207 of the sub-device 200, the data 1 to 4 of the data memory 207 written to the sub-device 200, and the checksum are arranged. The write command, that is, "0", means data is to be written to the address [14:7] of the data memory 207 of the sub-device 200.

Figure 3:
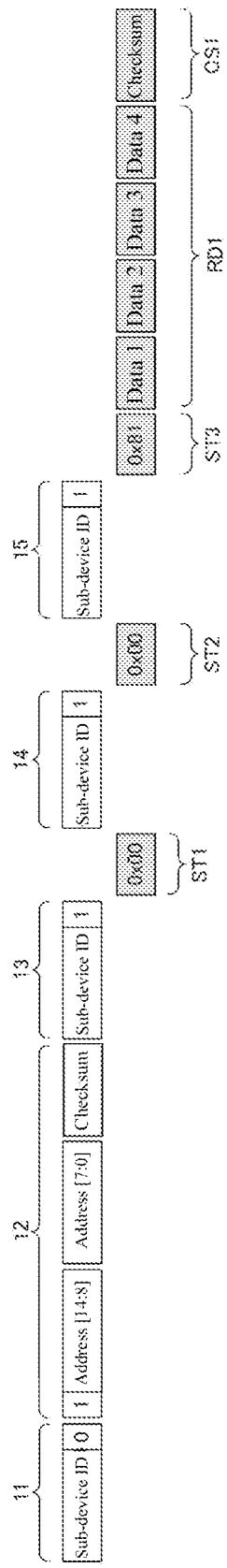
FIG. 3 is a schematic diagram of a brief configuration example of a read packet.

A read packet is a packet used to read data from the data memory 207 of the sub-device 200. FIG. 3 shows a schematic diagram of a brief configuration example of a read packet.

The read packet shown in FIG. 3 is configured to arrange the first byte 11 defined by the I2C standard, the data 12 defined by the I2C standard, and the first bytes 13 to 15 defined by the I2C standard in order from the beginning.

The first bytes 11 and 13 to 15 respectively include information related to a sub-device ID and direction.

In the example in FIG. 3 the direction of the first byte 11 is "0". The value "0" means that writing information from the main device 100 to the sub-device 200 is to be performed. In the read packet, the value "0" means writing data read out from the memory of the secondary device 200.

The content of the data 12 can be determined by a user as desired. In the data 12 in the example in FIG. 3, "1", the address [14:8] of the data memory 207 of the sub-device 200, the address [7:0] of the data memory 207 of the sub-device 200, and the checksum are arranged. The value "1" herein means data is to be read from the address [14:7] of the data memory 207 of the sub-device 200.

In the example in FIG. 3, the direction of the first bytes 13 to 15 is "1". The value "1" represents reading from the sub-device 200 by the main device 100 to be performed. That is to say, the value "1" herein is a read command to read data from the address [14:0] of the data memory 207 of the sub-device 200 specified above.

In the example in FIG. 3, after the main device 100 transmits the first byte 13, the main device 100 receives a status signal ST1 in a second state (0x00), and so the main device 100 transmits the first byte 14 after a predetermined standby time has elapsed from the main device 100 identifying the status signal ST1 in the second state (0x00).

Moreover, in the example in FIG. 3, after the main device 100 transmits the first byte 14, the main device 100 receives a status signal ST2 in a second state (0x00), and so the main device 100 transmits the first byte 15 after a predetermined standby time has elapsed from the main device 100 identifying the status signal ST2 in the second state (0x00).

In addition, in the example in FIG. 3, after the main device 100 transmits the first byte 15, the main device 100 receives a status signal ST3 in a first state (0x81), a read data RD1 and a checksum CS1. Thus, after the main device 100 transmits the first byte 15, the first byte including the read command is not transmitted.

The transmitter 106 transmits a write packet or a read packet.

The transmission/reception switching unit 107 switches between transmission processing and reception processing.

The read memory 108 temporarily stores data read from the data memory 207 of the sub-device 200. The read memory 108 is implemented by, for example, a FIFO memory.

The status signal receiver 109 receives the status signal transmitted from the sub-device 200.

The sub-device 200 includes a transmission/reception switching unit 201, a receiver 202, a write memory 203, a bus 204, a CPU 205, a program memory 206, a data memory 207, a read memory 208, a transmission data generator 209, and a status setting unit 210.

The transmission/reception switching unit 201 switches between transmission processing and reception processing.

The receiver 202 receives a write packet or a read packet. If the receiver 202 receives a write packet or a read packet, the CPU 205 starts an interrupt process.

The write memory 203 temporarily stores data written to the data memory 207. The write memory 203 is implemented by, for example, a FIFO memory.

The bus 204 connects the write memory 203, the CPU 205, the program memory 206, the data memory 207, the read memory 208 and the status setting unit 210 to one another.

The CPU 205 controls the entire sub-device 200 according to a program stored in the program memory 206.

The program memory 206 stores programs, and the data memory 207 stores data.

The read memory 208 temporarily stores data read from the data memory 207. The read memory 208 is implemented by, for example, a FIFO memory.

The transmission data generator 209 generates data to be transmitted to the main device 100.

The status setting unit 210 sets a status signal to a first state or a second state.

<Brief Operations of Communication System when Main Device Transmits Read Packet to Sub-Device>

Figure 4:
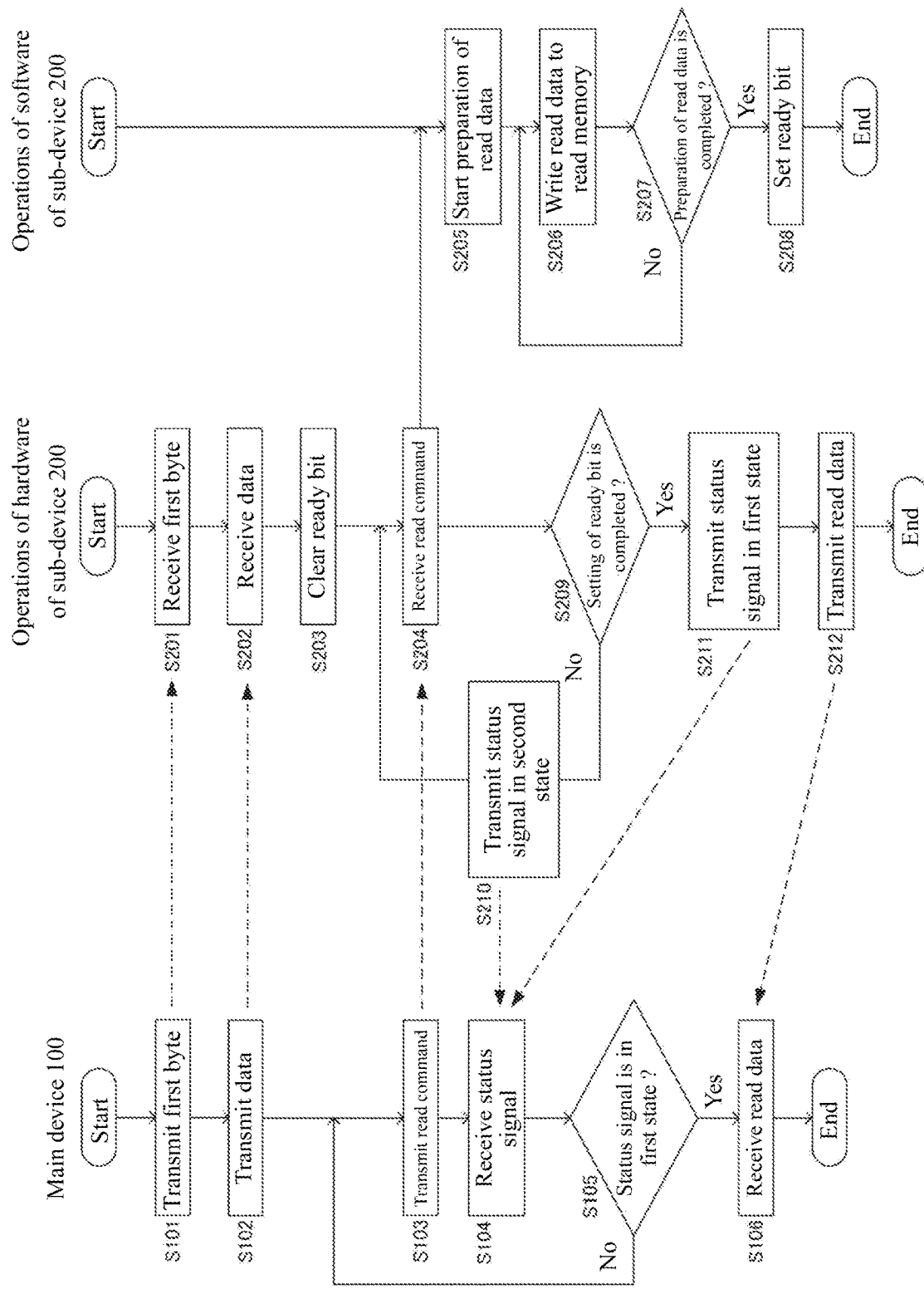
FIG. 4 is a flowchart of brief operations of a communication system when a main device transmits a read packet to a sub-device.

Next, referring to the flowchart shown in FIG. 4, brief operations of a communication system when the main device 100 transmits a read packet to the sub-device 200 are described below.

The operations of the main device 100 are first described. In step S101, the transmitter 106 transmits a first byte. Then, the transmitter 106 transits data (step S102). Then, the transmitter 106 transits a read command (step S103). Then, the status signal receiver 109 receives a status signal (step S104).

In step S105 following step S104, the CPU 101 determines whether the status signal is in a first state.

When the CPU 101 determines that the status signal is not in a first state ("No" of step S105), after a predetermined standby time has elapsed from it is determined that the status signal is in a second state, in other words, from the status signal identified as in a second state, the method returns to step S103 to repeat the transmission of the read command. Moreover, because the status signal is in either of the first state and the second state, a situation where the CPU 101 determines that the status signal is not in a first state has the same significance as in a situation where the CPU 101 determines that the status signal is in the second state.

In the other hand, when the CPU 101 determines that the status signal is in the first state ("Yes" of step S105), the method proceeds to step S106.

In step S106, the main device 100 receives the read data. After being temporarily stored to the read memory 108, the read data is written to the data memory 103.

Next, respective operations of software and hardware of the sub-device 200 are described. In step S201, the receiver 202 receives a first byte.

In step S201, the receiver 201 receives a first byte. Then, the receiver 201 receives data (step S202). When the receiver 202 receives data, the status setting unit 210 clears a ready bit and sets it to "0" (step S203).

Moreover, when the receiver 201 receives a read command in step S204 following step S203, the CPU 205 starts to prepare to read data through an interrupt process (step S205). More specifically, the CPU 205 starts a process of reading data from the data memory 207 according to a specified address in the data, and writing it to the read memory 208.

Then, the CPU 205 continues the process of writing the read data to the read memory 208 (step S206).

In step S207 following step S206, the CPU 205 confirms the preparation of read data, that is, whether the writing of the read data to the read memory 208 is completed. When the preparation of the read data is not completed ("No" of step S207), the method returns to step S206. On the other hand, when the preparation of the read data is completed ("Yes" of step S207), the CPU 205 sets the ready bit stored in the status setting unit 10 to "1" (step S208). When the process of step S208 ends, the operations of the software of the sub-device 200 end.

In step S209 following step S204, it is determined whether setting of the ready bit is completed, in other words, whether the ready bit is "1". More specifically, the status setting unit 210 determines whether the setting of the ready bit is completed and whether the read memory 208 is empty.

That is to say, in this embodiment, the status signal is set to the second state even if the status setting unit 210 determines that the read data has been prepared in the read memory 208 when the read memory 208 is empty. For example, when the processing of the CPU 205 is not appropriate and the read memory 208 is empty, reading data from the read memory 208 can be prohibited, thereby achieving a failsafe design.

Moreover, different from this embodiment, the status setting unit 210 may also set the status signal to a first state when the ready bit is "1", and set the status signal to a second state when the ready bit is "0".

When at least one of the condition that the ready bit is "0" and the condition that the ready memory 208 is empty ("No" of step S209) is satisfied, the status setting unit 210 sets the status signal to a second state, the reception/transmission switching unit 210 and the transmission data generator 209 transmit the status signal in the second state to the main device 100 (step S210), and the method returns to step S204.

On the other hand, when the ready bit is "1" and the ready memory 208 is not empty ("Yes" of step S209), the status setting unit 210 sets the status signal to a first state, the reception/transmission switching unit 201 and the transmission data generator 209 transmit the status signal in the first state to the main device 100 (step S211).

In step S212 following step S211, the reception/transmission switching unit 201 and the transmission data generator 209 transmit the read data stored in the read memory 208 to the main device 100. When the process of step S212 ends, the operations of the hardware of the sub-device 200 end.

With the above operations, if read data has been prepared in the read memory 208, the main device 100 can receive the read data without any delay. Thus, the communication system SY1 is capable of achieving a reduced communication time without using clock stretching.

<Brief Operations of Communication System when Main Device Transmits Write Packet to Sub-Device>

Figure 5:
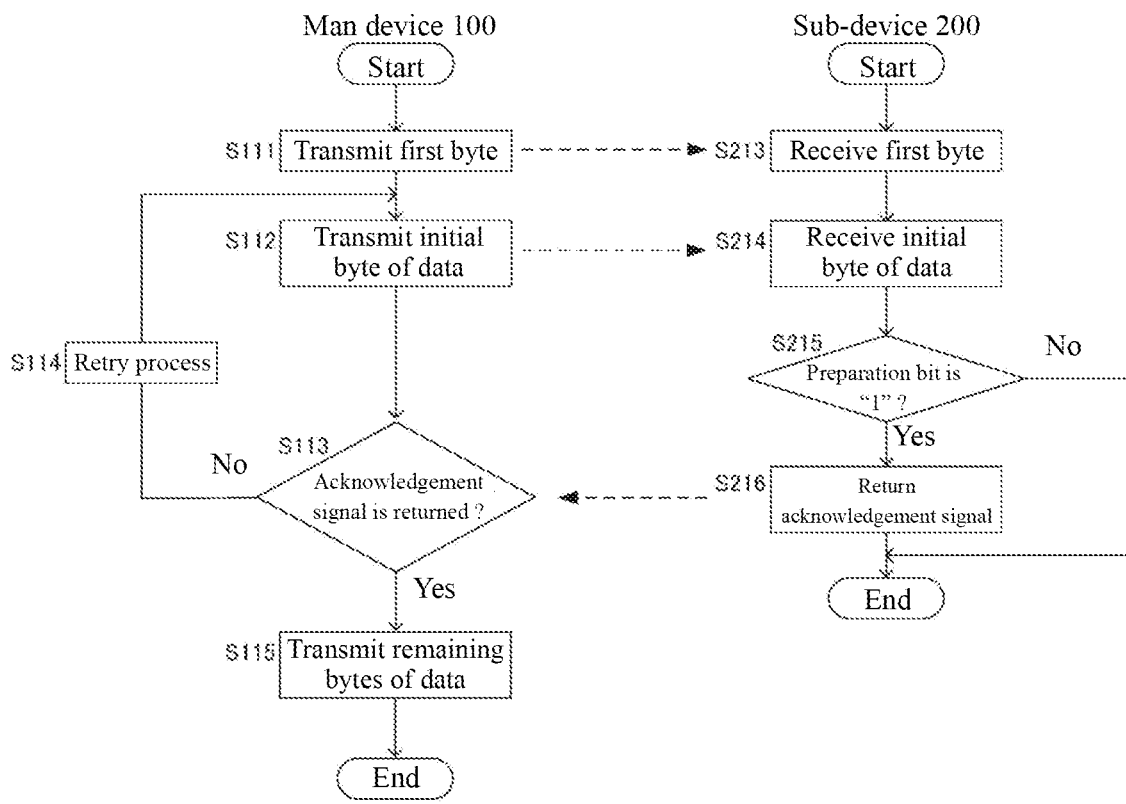
FIG. 5 is a flowchart of brief operations of a communication system when a main device transmits a write packet to a sub-device.

Next, referring to the flowchart shown in FIG. 5, brief operations of a communication system when the main device 100 transmits a write packet to the sub-device 200 are described below.

The operations of the main device 100 are first described. In step S111 the transmitter 106 transmits a first byte. Next, the transmitter 106 transmits an initial byte (in the example in FIG. 2, the write command, that is, "0", and the address [14:8] of the data memory 207 of the sub-device 200) of the data.

Next, the CPU 101 confirms whether an acknowledgement signal is returned from transmitting the initial byte to after a predetermined time has elapsed (step S113). If the acknowledgement signal is not yet returned ("No" of step S113), the method starts retrying the process (step S114) and returns to step S112 to retransmit the data.

On the other hand, if the acknowledgement signal is returned ("Yes" of step S113), the transmitter 106 transmits the remaining bytes in the data (step S115), and the process ends.

Next, the operations of the sub-device 200 are described. In step S213, the receiver 202 receives a first byte.

Then, the receiver 202 receives the initial byte of the data (step S214). In step S215 following step S214, the CPU 205 confirms whether the ready bit is "1". If the ready bit during reception of the write command is not "1" ("No" in step S215), the CPU 205 determines that the data cannot be continuously written to the write memory 203 and does not generate an acknowledgement signal, and the process ends.

On the other hand, if the ready bit is "1" ("Yes" of step S215), the CPU 205 determines that the data can be continuously written to the write memory 203, generates the acknowledgement signal, and returns the acknowledgement signal to the main device 100 by the transmission/reception switching unit 201 and the transmission data generator 209 (step S216), and the process ends.

Herein, the ready bit is cleared and set to "0" from when the status setting unit 210 receives the data of the write packet through the receiver 202 to the end. Moreover, if the write memory 203 is empty, the status setting unit 210 sets the ready bit to "1".

With the above operations, a situation in which data is not written in time in the sub-device 200 can be avoided.

Disclosure Example

Figure 6:
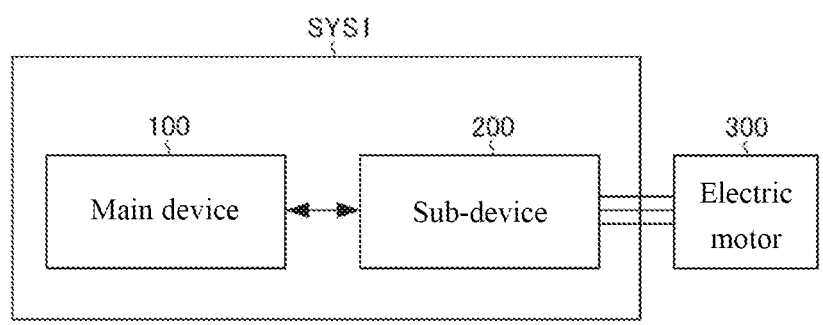
FIG. 6 is a diagram of an example of a communication system according to an embodiment.

FIG. 6 shows a diagram of a disclosure example of the communication system SYS1. In the disclosure example in FIG. 6, the main device 100 is a microprocessor unit (MPU), and the sub-device 200 is an electric motor driver integrated circuit (IC). The main device 100, that is, the MPU, controls the sub-device 200, that is, the electric motor driver IC. The sub-device 200, the electric motor driver IC, drives an electric motor 300 according to the control of the main device 100, that is, the MPU.

In addition, the disclosure example in FIG. 6 servers merely as an example. For example, the sub-device 200 may also be a sensor IC or a power IC.

It should be understood that all aspects of the embodiment are exemplary rather than restrictive, and it should also be understood that the technical scope of the disclosure of the present disclosure is not limited to the description associated with the embodiment, but includes all equivalences within the scope of the appended claims and all modifications made within the scope.

For example, although I2C communications are used in the embodiments, the disclosure is not limited to I2C communications, and communications other than I2C communications are also applicable, provided with the main device 100 and the sub-device 200 communicate based on a clock signal output from the main device 100. The communications, other than I2C communications, by which the main device 100 and the sub-device 200 perform communication based on the clock signal output from the main device 100 are, for example, but not limited to, Serial Peripheral Interface (SPI) communications.

A sub-device (200) in the above description is configured as (a first configuration), including: a receiver (202), configured to receive a read command from a main device (100); a status signal transmitter (201), configured to transmit a status signal to the main device; a read memory (208); and a status setting unit (210), configured to determine whether a read data has been prepared in the read memory, wherein when the read data has been prepared in the read memory, the status signal is set to a first state, and when the read data has not been prepared in the read memory, the status signal is set to a second state.

The sub-device of the first configuration is capable of achieving a reduced communication time without using clock stretching.

In the sub-device of the first configuration, the status setting unit may also be configured as (a second configuration), configured to set the status signal to the second state even if the status setting unit determined that the read data has been prepared in the read memory when the read memory is empty.

The sub-device of the second configuration is capable of prohibiting data from being read from the read memory when the read memory is empty, thus implementing a failsafe design.

The sub-device of the first or second configuration may also be configured as (a third configuration), wherein the status signal transmitter transmits the status signal triggered by reception of a read command by the receiver.

The sub-device of the third configuration is capable of transmitting the status signal at an appropriate timing.

The sub-device of any of the first to third configurations may also be configured as (a fourth configuration), including: a write memory; and an acknowledgment signal generator, configured to generate an acknowledgment signal for a write command; wherein, the receiver is also configured to receive a write command from the main device, and the acknowledgment signal generator is configured to determine whether a data can be continuously written to the write memory, and to generate the acknowledgment signal when the continuous writing is possible.

The sub-device of the fourth configuration is capable of avoiding a situation in which data is not written in time.

A main device (100) in the above description is configured as (a fifth configuration), including: a transmitter (106), configured to transmit a read command to a sub-device; a status signal receiver (109), configured to receive a status signal from the sub-device; and a controller (101), configured to render the transmitter to re-transmit the read command when the status signal is in a first state, and read a data from the sub-device when the status signal is in a second state.

The main device of the fifth configuration is capable of achieving a reduced communication time without using clock stretching.

A communication system (SYS1) in the above description is configured as (a sixth configuration) including the sub-device of any of the first to fourth configurations and the main device of the fifth configuration.

The communication system of the sixth configuration is capable of achieving a reduced communication time without using clock stretching.

The invention claimed is:

1. A sub-device, comprising:
    a receiver configured to receive a read command from a main device;
    a status signal transmitter configured to transmit a status signal to the main device;
    a read memory;
    a status setting unit configured to determine whether a read data has been prepared in the read memory, wherein
        when the read data has been prepared in the read memory, the status setting unit is configured to set the status signal to a first state, and
        when the read data has not been prepared in the read memory, the status setting unit is configured to set the status signal to a second state; and
    a transmission data generator configured to transmit the read data from the read memory to the main device after the status signal with the first state is transmitted by the status signal transmitter,
    wherein the receiver is further configured to re-receive the read command from the main device when the status signal with the second state is transmitted by the status signal transmitter.

2. The sub-device of claim 1, further comprising:
    a write memory; and
    an acknowledgment signal generator, configured to generate an acknowledgment signal for a write command, wherein
    the receiver is also configured to receive a write command from the main device, and
    the acknowledgment signal generator is configured to determine whether a data can be continuously written to the write memory, and to generate the acknowledgment signal when the continuous writing is possible.

3. A communication system, comprising:
    the sub-device of claim 1,
    wherein the main device comprises:
        a transmitter, configured to transmit the read command to the sub-device;
        a status signal receiver, configured to receive the status signal from the sub-device; and
        a controller, configured to
            render the transmitter to re-transmit the read command when the status signal is in the second state, and
            read the read data from the sub-device when the status signal is in the first state.

4. The sub-device of claim 1, wherein the status signal transmitter transmits the status signal triggered by reception of a read command by the receiver.

5. The sub-device of claim 4, further comprising:
    a write memory; and
    an acknowledgment signal generator, configured to generate an acknowledgment signal for a write command, wherein
    the receiver is also configured to receive a write command from the main device, and
    the acknowledgment signal generator is configured to determine whether a data can be continuously written to the write memory, and to generate the acknowledgment signal when the continuous writing is possible.

6. The sub-device of claim 1, wherein the status setting unit is configured to set the status signal to the second state even if it is determined that the read data has been prepared in the read memory when the read memory is empty.

7. The sub-device of claim 6, further comprising:
a write memory; and
an acknowledgment signal generator, configured to generate an acknowledgment signal for a write command, wherein
the receiver is also configured to receive a write command from the main device, and
the acknowledgment signal generator is configured to determine whether a data can be continuously written to the write memory, and to generate the acknowledgment signal when the continuous writing is possible.

8. The sub-device of claim 6, wherein the status signal transmitter transmits the status signal triggered by reception of a read command by the receiver.

9. The sub-device of claim 8, further comprising:
a write memory; and
an acknowledgment signal generator, configured to generate an acknowledgment signal for a write command, wherein
the receiver is also configured to receive a write command from the main device, and
the acknowledgment signal generator is configured to determine whether a data can be continuously written to the write memory, and to generate the acknowledgment signal when the continuous writing is possible.

* * * * *